United States Patent [19]

Spurdle

[11] 3,983,618

[45] Oct. 5, 1976

[54] METHOD OF SECURING NAILS AND END-DRIVEN INTO A SHEET OF PARTICLE BOARD

[76] Inventor: Graham David Spurdle, 675 Alpine Court, North Vancouver, B. C., Canada

[22] Filed: Feb. 3, 1975

[21] Appl. No.: 546,734

[52] U.S. Cl. .................................. 29/432.1; 29/402; 52/514; 144/310 R

[51] Int. Cl.[2] .......................................... B23P 11/02

[58] Field of Search................... 27/432, 432.1, 401, 27/402; 144/310 R; 52/514

[56] References Cited

UNITED STATES PATENTS

| | | | |
|---|---|---|---|
| 2,008,086 | 7/1935 | Sorenson | 85/49 |
| 2,014,892 | 9/1935 | Graham et al. | 52/514 X |
| 2,171,530 | 9/1939 | Balfe | 156/92 |
| 2,470,514 | 5/1949 | Muller | 52/514 |
| 2,955,291 | 10/1960 | Hansen | 29/432 |
| 3,376,911 | 4/1968 | Henning | 29/432 X |

*Primary Examiner*—Victor A. Di Palma
*Attorney, Agent, or Firm*—Carver and Company

[57] ABSTRACT

A method of securing a nail end-driven into a sheet of particle board in which a staple is driven through the particle board and ends of the legs clenched inwardly against side surface of the particle board in a direction normal to the side surfaces of the board so as to increase purchase of the end-driven nail driven between the staple legs.

1 Claim, 2 Drawing Figures

METHOD OF SECURING NAILS END-DRIVEN INTO A SHEET OF PARTICLE BOARD

BACKGROUND OF THE INVENTION

1. Field of the Invention

This invention relates to a method of providing purchase for nails end-driven into a sheet of particle board.

2. Prior Art

Composition sheet material, particularly that type of sheet material, commonly termed particle board, in which layers of thin wood chips are, under pressure and with the use of adhesives, compressed into the form of a board, characteristically will withstand high flexural stresses and also provides good purchase for face-driven nails. The bond between adjacent chips in this type of board, however, is relatively weak, consequently, end-driven nails tend to split the board and find little purchase.

SUMMARY OF THE INVENTION

The present invention provides a means and method for reducing tendency of the board to split and thereby increase the purchase of end-driven nails.

In the present invention the adhesive bond of adjacent chips is enhanced by mechanically restraining separation of opposite faces in the area in which it is intended to drive a nail, the means being provided by way of staples which are driven into one side surface of the board and the projecting points clenched across the opposite side surface of the board.

A detailed description following, related to drawings, gives exemplification of apparatus and method according to the invention which, however, is capable of expression in method and means other than those particularly described and illustrated.

DESCRIPTION OF THE DRAWINGS

In the drawings which illustrate the invention.

DETAILED DESCRIPTION

Figure 1:
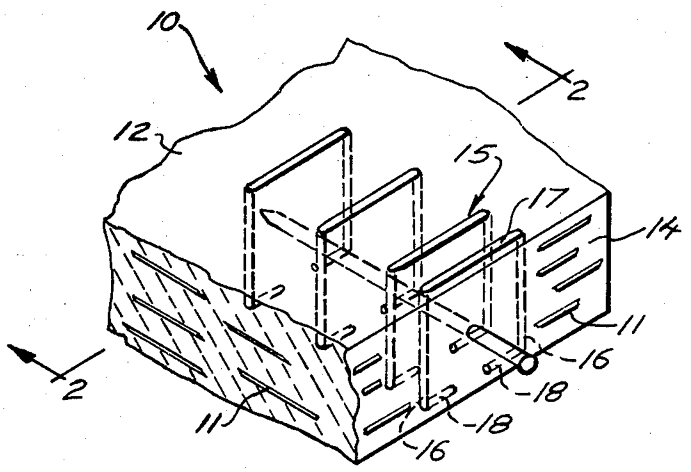
FIG. 1 is a perspective view of a portion of a particle board illustrating the invention.

Referring to the drawings the numeral 10 represents a section of a composition board conventionally termed "particle board," which is formed of a plurality of thin wooden chips 11 which are adhesively bonded to one another under pressure. The board is usually about ½ inch to ¾ inch in thickness and has relatively smooth opposite side surfaces 12 and 13 respectively.

This type of board has relatively high flexural strength, however, the adhesive bond between chips is not of a high order of strength, i. e. compared to a sawn board, and tends to split in planes parallel to the lay of the chips when nails are end-driven into the board edge 14. Nails so driven, consequently, obtain very little purchase. Nails driven transversely through the board do, however, obtain considerable purchase, substantially the same as that of a nail driven into a sawn board.

In accordance with the invention a staple 15 which, conventionally, is U-shaped having a pair of parallel legs 16—16, length of which are in excess of the thickness of the board, and a base bar 17, is driven into the board on one side 12 thereof with the base bar parallel to the board edge, so that the base bar meets the side surface 12 and the legs project from the side surface 13. The projecting ends 18—18 of the legs are then clenched inwardly towards each other against the side surface 13. The nail 19 is then end-driven into the board between the legs of the staple.

Figure 2:
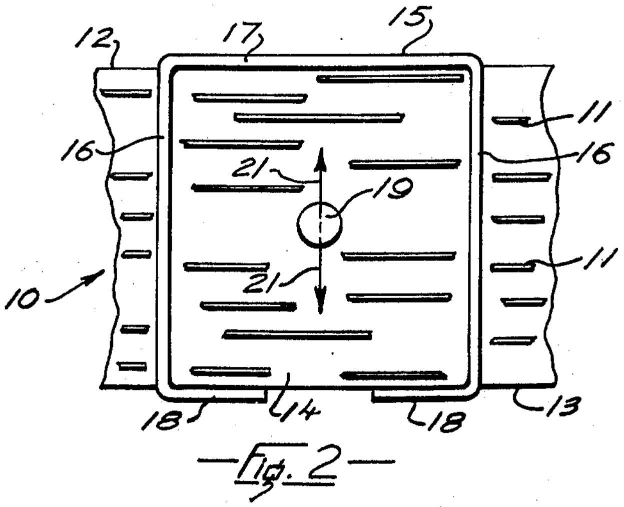
FIG. 2 is an enlarged sectional view taken on line 2—2 of FIG. 1.

Referring to FIG. 2 it is seen that the staple bearing against opposite side surfaces of the board acts in the nature of a clamp to resist expansion of that portion of the board between the legs in the directions as shown by the arrows 21. Tendency of the board to split in planes normal to the direction of the arrow 21 is thus inhibited so that purchase of the nails is increased.

As shown in FIG. 2 the length of the base bar of the staple should not be greater than the board thickness so that sides of the compression envelopes develop by stresses imposed by the nail pass, at least, outside of the corner between the legs and the clenched projecting end portions.

To increase purchase of the nail a plurality of staples can be driven into the board as shown in FIG. 1 in spaced alignment. The staples thus delineate the boundaries of a tubular envelope substantially the length of the nail to be driven therein, thus inhibiting tendency of the board to split throughout the envelope, and thus measurably increasing the purchase of the nail.

I claim:

1. A method of treating a sheet of particle board to enhance purchase of nails end-driven thereinto comprising the steps of:

a. driving a plurality of staples disposed in spaced side-by-side relationship through one side strip of a sheet of particle board, the legs of each staple being longer than width of the particle board so as to protrude through the opposite side surface of the board, b. clenching the protruding ends of the legs inwardly against said opposite side surface of the board so that the base, legs and clenched leg ends delineate a tubular envelope extending inwards from the edge of the particle board and into which the nail can be driven.

* * * * *